United States Patent
Anand

(10) Patent No.: US 11,843,965 B2
(45) Date of Patent: Dec. 12, 2023

(54) INTELLIGENT CONNECTIVITY AND DATA USAGE MANAGEMENT FOR MOBILE DEVICES IN A CONVERGED NETWORK

(71) Applicant: CHARTER COMMUNICATIONS OPERATING, LLC, St. Louis, MO (US)

(72) Inventor: Mohit Anand, Centennial, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 74 days.

(21) Appl. No.: 17/115,241

(22) Filed: Dec. 8, 2020

(65) Prior Publication Data

US 2022/0182873 A1 Jun. 9, 2022

(51) Int. Cl.
*H04W 28/02* (2009.01)
*H04W 76/15* (2018.01)
*H04W 28/24* (2009.01)
*H04W 28/20* (2009.01)

(52) U.S. Cl.
CPC ....... *H04W 28/0268* (2013.01); *H04W 28/20* (2013.01); *H04W 28/24* (2013.01); *H04W 76/15* (2018.02)

(58) Field of Classification Search
CPC . H04W 28/20; H04W 48/20; H04W 28/0268; H04W 28/24
See application file for complete search history.

(56) References Cited

U.S. PATENT DOCUMENTS

| | | | |
|---|---|---|---|
| 8,429,103 B1 | 4/2013 | Aradhye et al. | |
| 8,958,821 B2 | 2/2015 | Abraham et al. | |
| 9,363,704 B2 | 7/2016 | Tabet et al. | |
| 10,108,757 B1* | 10/2018 | Aghajan | H04W 16/18 |
| 11,190,985 B1* | 11/2021 | Indurkar | H04L 67/303 |
| 2010/0265827 A1* | 10/2010 | Horn | H04W 72/56 370/329 |
| 2012/0294278 A1* | 11/2012 | Wang | H04W 36/26 370/331 |
| 2014/0071895 A1 | 3/2014 | Bane et al. | |
| 2016/0198360 A1* | 7/2016 | Smith | H04W 72/0453 370/237 |
| 2018/0317146 A1 | 11/2018 | Fitzpatrick | |
| 2019/0281491 A1* | 9/2019 | Cheng | H04W 28/0252 |
| 2021/0243654 A1* | 8/2021 | Saltsidis | H04W 28/24 |
| 2021/0368393 A1* | 11/2021 | Kotecha | H04B 17/3913 |
| 2022/0150794 A1* | 5/2022 | Sparks | H04W 4/029 |
| 2022/0174589 A1* | 6/2022 | Bellamkonda | H04B 7/0617 |

* cited by examiner

*Primary Examiner* — Syed Ali
(74) *Attorney, Agent, or Firm* — Patent Beach PC

(57) ABSTRACT

Various embodiments comprise systems, methods, architectures, mechanisms and apparatus for managing user equipment (UE) communications in a converged network by causing such UE to automatically select a "best" wireless network (cellular RAN/WiFi) without any user notification/interaction to the user of the UE, such as via the device user interface (UI). The best wireless network may be determined using contemporaneous QoS related measurements, or predicted QoS measurements such as provided by a RAN node or channel QoS model generated via machine learning techniques, which may also be used to determine a type of QoS needed for each application or service commonly invoked at the UE so as to automatically provide the best possible user experience without any user intervention.

20 Claims, 3 Drawing Sheets

INTELLIGENT CONNECTIVITY AND DATA USAGE MANAGEMENT FOR MOBILE DEVICES IN A CONVERGED NETWORK

FIELD OF THE DISCLOSURE

The present disclosure generally relates to wireless communications systems and related networks, and more particularly to mechanisms supporting seamless automatic migration of user equipment (UE) between radio access networks (RANs).

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Converged networks contemplate that user equipment (UE) utilizing network services (e.g., voice, streaming media, data upload/download etc.) may access any available/compatible network, such as a WiFi network (e.g., 802.11xx networks) or mobile networks (e.g., Universal Mobile Telecommunications Systems (UMTSs), Long Term Evolution (LTE), and 5th Generation New Radio (5G-NR) such as described and being developed by the Third Generation Partnership Project (3 GPP)).

An advantage of a converged network is the ability of subscriber UE to select whichever radio access network (RAN) available to the UE provides the best quality of service (QoS), such as the WAP or LTE eNB offering the best signal strength or channel quality as determined by the UE (e.g., such as via a Received Signal Strength Indicator (RSSI) or other measure of received radio frequency power on a channel).

Another factor in UE selection of a RAN pertains to the amount of data consumed by the UE during a current billing period. Whether a subscriber has a fixed data plan or an "unlimited" data plan, there is a plan limit or level of data consumption by the UE that will result in the mobile network provider constraining UE data consumption (i.e., data throttling) or forcing the subscriber to purchase additional and often expensive increments of data (e.g., 1 Gb blocks as needed).

SUMMARY

Various deficiencies in the prior art are addressed by systems, methods, architectures, mechanisms and apparatus for managing user equipment (UE) communications in a converged network by causing such UE to automatically select a "best" wireless network (cellular RAN/WiFi) without any user notification/interaction to the user of the UE, such as via the device user interface (UI). The best wireless network may be determined using contemporaneous QoS related measurements, or predicted QoS measurements such as provided by a RAN node or channel QoS model generated via machine learning techniques, which may also be used to determine a type of QoS needed for each application or service commonly invoked at the UE so as to automatically provide the best possible user experience without any user intervention.

One embodiment comprises a method for managing network connectivity of dual radio access network (RAN) capable user equipment (UE) within a converged network comprising mobile network nodes and WiFi access points (WAPs), the method comprising: determining a location of subscriber UE; determining, for each RAN node or WAP supporting a coverage area including the location of the UE, a respective nominal Quality of Service (QoS) level for the node or WAP; determining, for each RAN node or WAP supporting the coverage area including the location of the UE, a modified QoS level in accordance with the respective nominal QoS level and any active service provider bandwidth limitation imposed upon the UE; selecting, for use by the UE, a RAN node or WAP associated with a highest modified QoS level.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
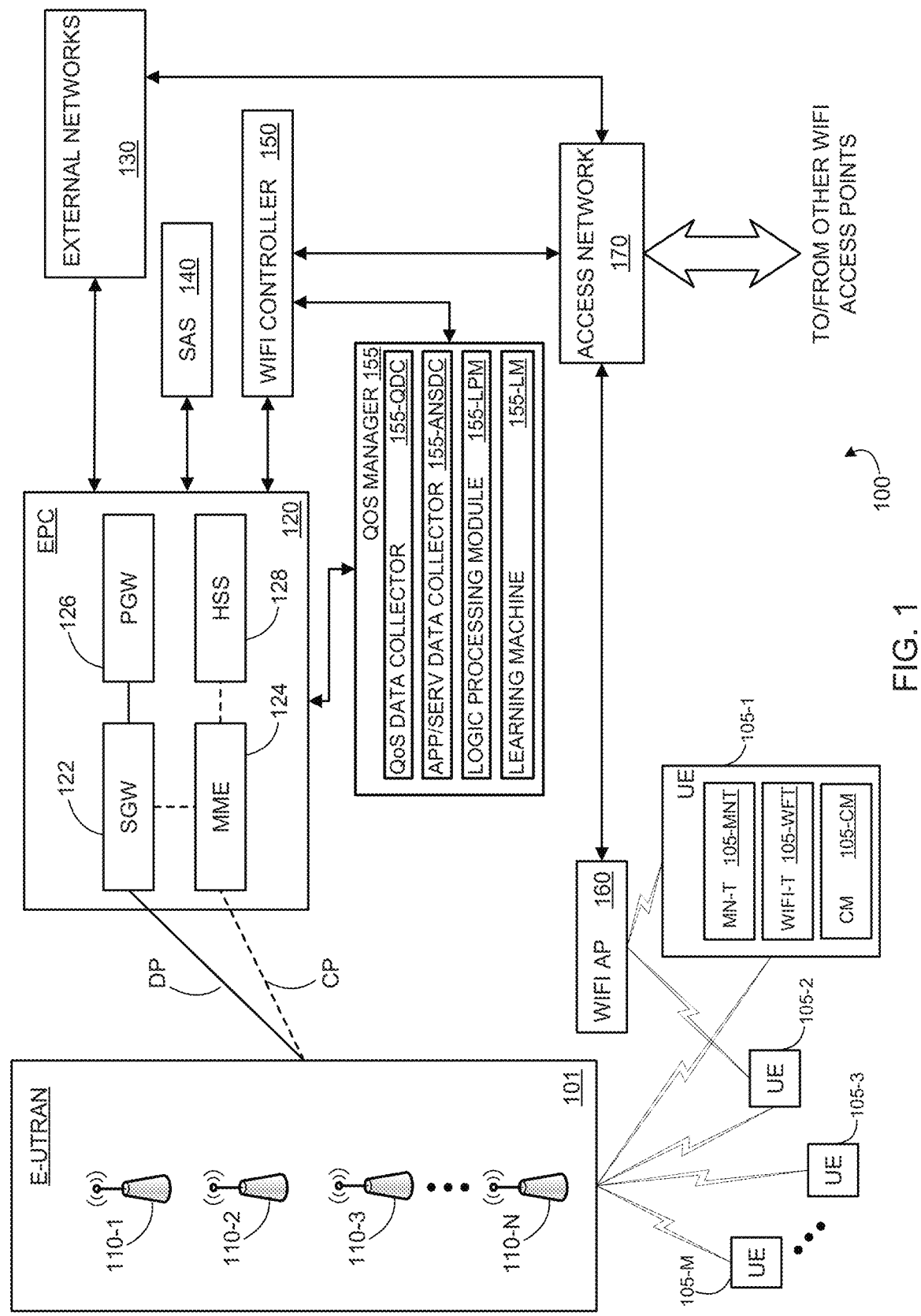
FIG. 1 depicts a block diagram of a network services architecture suitable for use in various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments contemplate causing user equipment (UE) within a converged network operable to automatically select a "best" wireless network (cellular RAN/WiFi) without any user notification/interaction to the user of the UE, such as via the device user interface (UI). The best wireless network may be determined using contemporaneous QoS related measurements, or predicted QoS measurements such as provided by a RAN node (e.g., node or WAP) or channel QoS model generated via machine learning techniques, which may also be used to determine a type of QoS needed for each application or service commonly invoked at the UE so as to automatically provide the best possible user experience without any user intervention.

Various embodiments contemplate a family (or company) scenario where there may be multiple UEs on similar plans, wherein data usage may be significantly different between the UEs, and a first UE might reach a throttling threshold before other UE(s). In such scenario, some embodiments contemplate that available unused data from the other UE(s) may be allocated to the throttled first UE within the service or billing cycle so that the user of the first UE may continue enjoying the applications as best as possible.

In various embodiments, a user may configure an initial type of plan when signing up with service provider wherein the initial type of plan is modified or replaced in accordance with usage pattern such that a user is continually provided with a "best value" type of service plan by the provider. Specifically, service providers only provide usage and plan recommendations and there is high possibility that user chooses a sub-optimal data plan. In such cases the UE and/or service provider equipment (PE) may monitor data usage and automatically notify the network to change the user's plan if it is detected that the user is frequently reaching a throttling threshold or other QoS constraining threshold such that the user is receiving a poor experience, or paying more than they should be paying had they been provided with an optimal plan in accordance with their actual network services usage.

FIG. 1 depicts a block diagram of a network services architecture suitable for use in various embodiments. Specifically, FIG. 1 depicts a converged network services architecture in which user equipment (UE) utilizing network services (e.g., voice, streaming media, data upload/download etc.) may access any available/compatible network as long as the quality of service (QoS) requirements of the relevant network services are satisfied, such as a WiFi network (e.g., 802.11xx networks) or mobile network (e.g., 3G, 4G/LTE, 5G).

Of particular interest with respect to the various embodiments is the actual QoS deliverable by the provider network to the UE via the various radio access network (RAN) nodes available to the UE. Specifically, the RAN node offering the best signal as measured by the UE may not be associated with the best overall QoS due to network congestion and other factors not discernable by the UE. Further, the UE may be subjected to the imposition of data throttling or other QoS reduction mechanisms, such as for exceeding within a service period (e.g., a month, a billing cycle, etc.) a total bandwidth allocation or a bandwidth allocation for a particular service.

Specifically, user equipment (UE) 105-1 through 105-M (collectively UE 105) are depicted as being configured for wirelessly communicating with one or more mobile network nodes 100-1 through 110-N (collectively nodes 110), the nodes 110 forming a E-UTRAN (e.g., LTE access network) 101 which is connected to an evolved packet core (EPC) 120 so as to provide thereby network services, such as from/to external networks 130. The UE 105 is also depicted as depicted as being configured for wirelessly communicating with a WiFi Access Point (WAP or AP) 160 which is connected to a WiFi Controller 150 via, illustratively, an access network 170 such as provided by a telecommunications, cable television, and/or other network services provider.

The WAP 160 may comprise an access point such as an 802.11xx wireless access point at a home, business or other location configured to communicate with UE 105 and with an access network 170. In various embodiments, a network services provider utilizes numerous such access points distributed over a "coverage footprint" to provide network services to mobile devices such as the UE 105 discussed herein.

The nodes 110 may comprise macrocells, small cells, microcells and the like such as eNodeBs, cellular network base stations, 4G/5G repeaters, and similar types of provider equipment. The nodes 110 may include nodes that use licensed 3G/4G/LTE/5G spectrum, unlicensed spectrum such as citizens broadband radio service (CBRS) spectrum, or a combination of licensed and unlicensed spectrum. In the case of nodes 110 having Citizens Broadband Radio Service Device (CBSD) capability, allocations of CBRS spectrum are provided via a Spectrum Access System (SAS) 140.

The UE 105 may comprise any type of wireless device configured for use in accordance with the various embodiments, such as user terminals (e.g., mobile phones, laptops, tablets and the like), fixed wireless access devices (e.g., set top boxes, digital video recorders, stationary computing devices and the like), Internet of Things (IoT) devices (e.g., sensors, monitoring devices, alarm system devices and the like), and/or other wireless devices. The UE 105 may include UE that use licensed 3G/4G/LTE/5G spectrum, unlicensed spectrum such as CBRS spectrum, or a combination of licensed and unlicensed spectrum. In the case of nodes 110 having CBSD capability, allocations of CBRS spectrum are provided via 140. The various embodiments contemplate the UE are configured to communicate via at least one mobile network (MN) radio access technology (RAT) such as 3G, 4G/LTE, and 5G, and at least one WiFi access point technology such as 802.11xx (e.g., 802.11b, 802.11a, 802.11g, 802.11n, 802.11ac, 802.11ax and so on).

The UE 105 comprises a mobile network transceiver 105-MNT configured for communications with any of nodes 110, a WiFi transceiver 105-WFT configured for communication with WAP 160, and a connection manager 105-CM configured to manage communications with the nodes 110 and APs 160, and to facilitate handoffs and UE migration between different nodes 110, between different APs 160, and between a node 110 and a WAP 160 as described herein. The UE 105 also comprises various other components, modules, antennas, and the like (not shown).

The connection manager 105-CM may be configured to cause the UE to give priority to WiFi connections when the UE becomes IDLE in 4G network. Further, the connection manager 105-CM may be configured to insert the IMSI of the UE into a "Connection Information" field included within some or all of the WiFi frames transmitted to the WAP 160 so that the WAP 160 knows the IMSI of connected UE, thereby facilitating rapid migration of such UE from the WiFi network of a WAP 160 to the mobile network of a MN node 110.

The connection manager 105-CM may be configured to sense the type of connection or radio access network (RAN) currently used by the UE, and to store authentication, location information, subscriber identification and the like associated with the currently used RAN and any previously used RAN. The connection manager 105-CM may be configured to sense at least some local QoS parameters of proximate/available RAN nodes (e.g., received signal strength, error rate, wireless channel congestions, ping latencies and the like associated with nodes 110, WiFi APs 160 and/or other RAN nodes).

The connection manager 105-CM may be configured to cooperate with the WiFi controller 150 to share local QoS information, location information (e.g., GPS location, hotspot bearing, identity of WAP or node providing received signal, received signal strength of WAP or node providing received signal, cellular mapping information, third party defined location, etc.). The connection manager 105-CM may be configured to cooperate with the WiFi controller 150 to migrate the UE between RAN nodes such as in response to the WC 150 determining that better QoS for the UE may be realized by such a migration based on a destination RAN node having superior backend QoS as compared to a current RAN node, or that a data throttling on the destination RAN node may be less than on the current RAN node due to a preferred node type, a sharing of bandwidth allocation with another UE of the same subscription/SLA, and/or other factors.

In various embodiments, the WC 150 and/or other network management entities associated with, e.g., the EPC 120 or access networks 170, monitor the operation of the various UE connected thereto in substantially real time to measure on a per-application, per-device level the throughput/latency associated with the application, and to use machine learning to determine the throughput/latency necessary for acceptable performance. Thus, in various embodiments, a decision to migrate UE from one RAN node to another RAN node may be made in response to a determination that a currently attached RAN node is failing or soon likely to be failing to provide the appropriate QoS for the application. That is, the nominal QoS being provided to the UE via the provider equipment (PE) is insufficient now or will be soon. Further, the imposition of data throttling or other QoS restrictions may operate to make the QoS provided by the currently attached RAN node more quickly insufficient to the application.

Data useful in driving a machine learning approach to application QoS benchmarking and the like includes for any data application (1) the name of the application; (2) UE/device name; signal strength, throughput, signal strength, throughput, latency and the like. Further, periodic deep packet inspection and other tools may be deployed to monitor device usage and the like.

Thus, for UE/device in a certain location, its current radio performance (throughput/latency/signal strength) may be measured against the database and if found lower than a corresponding threshold level, data usage may be examined more closely. If the data usage is still far away from the data throttling level, then proximate RAN nodes may be examined to see if their performance is better than that offered by the current RAN node.

The nodes 110 are configured to communicate with user equipment (UE) 105 as discussed herein. While the nodes 110 and UE 105 may operate in accordance with various radio access technologies (RATs), the embodiments will be discussed within the context of those nodes 110 and UE 105 configured to communicate with each other as Citizens Broadband Radio Service Devices (CBSDs) configured for operation within the Citizens Broadband Radio Service (CBRS), such as the 100 MHz band from 3.55 GHz to 3.65 GHz, the 150 MZ band between 3.55 GHz and 3.70 GHz, or some other spectral range as defined by the relevant authorities.

As depicted, the EPC 120 comprises four network elements; namely, a Serving Gateway (SGW) 122, a Mobility Management Entity (MME) 124, a Packet Data Network (PDN) Gateway (PGW) 126, and a Home Subscriber Server (HSS) 128. Other network and management elements are typically included within or used to manage an evolved packet core and related communications therewith as will be known to those skilled in the art.

The SGW 122 and PGW 126 handle user data or data plane (DP) functions; they transport the internet protocol (IP) data traffic (i.e., incoming and outgoing packets) between the User Equipment (UE) 105 and the external networks 130. The external networks 130 may comprise any external network, such as an IP Multimedia Core Network Subsystem (IMS).

The SGW 122 is a point of interconnect between the radio-side (e.g., via a backhaul connection to the E-UTRAN 101 as depicted or some other wireless network) and the EPC 120. As its name indicates, this gateway serves the UE by routing the incoming and outgoing IP packets. The SGW 122 is the anchor point for intra-LTE mobility (i.e. in case of handover between eNodeBs 110) and between LTE and other 3GPP accesses. The SGW 122 is logically connected to the PGW 126. It is noted that the SGW 122 may also be used to handle some control plane signaling in various configurations.

The PGW 126 is the point of interconnect for routing packets between the EPC 120 and external packet data networks (e.g., Internet Protocol (IP) networks) 330. The PGW also performs various functions such as IP address/IP prefix allocation, policy control and charging, and other functions.

The MME 124 and HSS 128 handle user signaling or control plane (CP) functions; they process signaling related to mobility and security for E-UTRAN 101 access. The MME 124 is responsible for the tracking and the paging of UE in idle-mode. It is the termination point of the Non-Access Stratum (NAS).

The HSS 128 comprises a database that contains user-related and subscriber-related information, and provides support functions in mobility management, call and session setup, user authentication, access authorization, and other functions. In various embodiments, the HSS 128 and, optionally, other management entities are configured to store subscription/service level agreement (SLA) data associated with many subscribers to a converged network such as described herein.

Generally speaking, UE 105 comprise subscriber devices capable of received network services such as voice, data, streaming media and the like via any of a plurality of RAT nodes, wherein the amount and/or type of services to be received is defined in accordance with the subscriber or SLA.

A fixed data plan may provide that in a given service period (e.g., a month) the individual UE (e.g., a subscriber's mobile phone) or group of UE (e.g., mobile phones and other devices of the subscriber and his/her family or company) may utilize individually or collectively up to a specific amount of data (e.g., 10 GB, 20 GB etc.) for a fixed cost to the subscriber, where data usage over that amount results in additional charges for incremental bandwidth purchases (e.g., 1 GB purchases). Alternatively, the individual or collective subscriber UE may enter a severely constrained/throttled mode of operation generally suitable for low-data services such as voice communications and the like.

An "unlimited" data plan may provide that in a given service period a subscriber's individual or group of UE may utilize an unlimited amount of data, except that data usage over an allocated amount of bandwidth (individual or collective) is throttled to a data rate that is minimally sufficient for most tasks, though not delivering the usual quality of experience to the subscriber(s).

Many variations on the themes of fixed data plan, unlimited data plan, premium data plan (e.g., includes higher guaranteed QoS and/or service offerings), pre-paid data plan and the like are known.

An EPC control plane signaling path CP may be used to provide information such as UE messages or signaling may be provided to the MME 124 or SGW 122. The MME 124 may also interact with various other EPC nodes such as the HSS 128 and SGW 122 to determine information helpful in generating reports and/or providing other information for managing the various networks in implementing the embodiments described herein.

As depicted in FIG. 1, a Spectrum Access System (SAS) 140 communicates with the EPC 120 and is configured to control access to the CBRS frequency band for RANs and other CBSD devices such as nodes 110 and UEs 105. Generally speaking, the SAS 140 is configured to ensure that the CBRS frequency band is allocated in accordance with the regulations promulgated by the relevant authorities.

As depicted in FIG. 1, a WiFi controller (WC) 150 communicates with a WiFi Access Point (WAP or AP) 160 via an access network 170. For simplification of the discussion, only one WAP 160 is shown in FIG. 1 as communicating with WiFi controller 150, and only one UE 105 (i.e., UE 105-1) is shown in FIG. 1 as communicating with that WAP 160. The WiFi controller 150, which may be implemented via a general purpose computer server, network operations center (NOC) equipment, or other provider equipment, is configured to perform various WiFi control functions associated with a large number of APs 160, as well as an even larger number of UEs 105 configured to communicate with the various APs 160.

The WC 150 may include a WiFi resource management mechanism which manages the coverage, the capacity, and/or other characteristics of individual WAPs 160 in order to optimize the quality of the services delivered to UE 105 via the WAPs 160. The population of WAPs to be managed may run into the tens or hundreds of thousands, including WAPs that support both private and public WiFi access. Each WAP is associated with a maximum number of Wifi users (UE) that may be connected at any given time. Each connected user must be managed by the WAP. Further, since each WAP may provide one or more carrier signals having formed thereon respective communications channels (illustratively, eleven in basic 802.11 schemes), each WAP must also manage its various channels including inter-channel interference and the like (e.g., by selecting the channels experiencing the least amount of interference).

Generally speaking, the WiFi controller (WC) 150 manages various operational aspects of the WAPs 160 and UE 105 connected thereto in accordance with WAP policies, subscriber/user profiles (e.g., such as defined in service level agreements) and the like. For example, each UE may be associated with a corresponding subscriber/user profile having defined therein guaranteed minimum levels of service, such as a minimum WAP download (DL) throughput, minimum upload (UL) throughput, and/or other minimum QoS levels.

The system 100 of FIG. 1 contemplates UE 105 associated with a network services provider capable of providing network services via either of a mobile network (e.g., 3G/4G/LTE/5G network) or a WiFi network (e.g., 802.11xx network). The WC 150 is configured to enable UE 105 to receive the appropriate QoS when connected to a WAP 160 (e.g., per subscriber policy), and that the WAP 160 is configured to provide the appropriate QoS to the UE 105.

In various embodiments, UE 105 authenticated to the mobile network (e.g., E-UTRAN network 101) may be opportunistically migrated to the WiFi network (e.g., connected to a WAP 160), and may provide mobile network information (e.g., IMSI and location data) via the WiFi network to the WC 150 to enable, illustratively, rapid and seamless migration of the UE 105 back to the mobile network. That is, since the WC 150 also communicates with the EPC 120 (e.g., with MME 124), the WC 150 is able to provide information to the MME 124 (e.g., UE IMSI, WAP 160 location and the like) suitable for use in rapidly migrating UE from coordinate the delivery of network services to subscriber/user UE 105.

PE-Centric QoS Determination and UE Migration

In various embodiments the WC 150 is enabled to receive management information pertaining to UE location, network services usage, application usage and the like. In various embodiments the WC 150 is enabled to receive QoS information pertaining to network services delivery channels supported by PE including the nodes 110 and EPC 120, as well as PE including the WAPs 160 and access network(s) 170. Such information may be received directly from such PE, from the EPC 120 and/or access network(s) 170, or via a management entity associated with the various networks. Such information may comprise specific QoS related measurements, models of QoS associated with one or more channel supporting PE elements, or some combination thereof. In various embodiments the WC 150 is configured to use UE information, PE QoS information, and/or other information to determine if specific UE should be migrated between a currently connected node or WAP and a different node or WAP.

In various embodiments, WC 150 gathers provider-side QoS information associated with actual and possible connections between the EPC 120 (via a MN 110) or access network 170 (via a WAP 160) and the UE 105, uses this nominal QoS information to determine which RAN node should be used by the UE, and causes the UE to migrate to that RAN node. The provider-side QoS information may be augmented with UE-provided local QoS parameters of proximate/available RAN nodes (e.g., signal strength, error rate, wireless channel congestions and the like associated with nodes 110, WiFi APs 160 and/or other RAN nodes). Such a migration may be implemented in response to the WC 150 determining that better QoS for the UE may be realized by such a migration based on a destination RAN node having superior backend QoS as compared to a current RAN node, or that a data throttling on the destination RAN node may be less than on the current RAN node due to a preferred node type, a sharing of bandwidth allocation with another UE of the same subscription/SLA, and/or other factors.

That is, the UE may be migrated between and available RAN node (mobile network or WiFi network) in accordance with (1) the RAN providing access to communications channel(s) or link(s) providing the best total QoS to the UE (i.e., not just the best signal strength), wherein the QoS may be determined in general or in reference to specific applications/services, such as for video streaming and the like.

Further, the nominal QoS associated with any given RAN node may be modified in accordance with data throttling or other QoS restrictions imposed upon the UE by the service provider, such as for "unlimited" plan UE where the service period bandwidth allocation has been exceeded.

As depicted in FIG. 1, a QoS manager (QM) 155 communicates with the WC 150, EPC 120, and/or other network management entities (not shown) and is configured to retrieve therefrom QoS indicative data associated with the various provider equipment (PE) supporting the delivery of network services to UE via multiple networks (e.g., nodes, WAPs, routers, switches, links, or other PE such as used to deliver network services to UE via the EPC 120, access network 170, and/or various other networks, backhaul networks, and the like). Further, the QoS manager provides, illustratively, QoS models of such PE used for delivering network services to UE 105 in accordance with various embodiments, such as QoS models of nodes 110, elements of the EPC 120, WAPs 160, elements of access networks 170, and/or communication channels thereof. These QoS models may be suitable for use in making attachment/connection decisions for UE having an ability to acquire network services from different nodes or WAPs, such as within overlapping network coverage areas, as discussed herein with respect to the various embodiments. The QM may be implemented at a computer server or other computing device such that hardware or a combination of hardware and software may be configured to support various QM modules, illustratively depicted herein as a QoS data collector 155-QDC, an application/network services data collector 155-ANSDC, a logic processing module 155-LPM, and a learning machine 155-LM.

The QoS data collector 155-QDC is configured for collecting QoS data associated with PE (and/or portions thereof) used for delivering network services to UE 105, such as nodes 110, elements of the EPC 120, WAPs 160, elements of access networks 170, communication channels thereof, and or portions/subsystems thereof.

The application/network services data collector 155-ANSDC is configured for collecting performance data associated with UE implemented applications, network services and the like.

The logic processing module 155-LPM is configured for performing various functions associated with grooming data for use by the learning machine 155-LM, post-processing of output data provided by the learning machine 155-LM, and performing various other functions as described herein. For example, in various embodiments directed to application-specific QoS or network services-specific QoS, the logic processing module 155-LPM may be configured to correlate the collected QoS data with the collected performance data such that modeling of PE (or portions thereof) may be refined so as to indicate QoS sufficiency for various applications/network services, and perform other functions.

The learning machine 155-LM is configured to execute a timeseries prediction algorithm to process the collected QoS data, management information such as network topology data, the optionally collected performance data and other data associated with the PE, UE, and/or use thereof to generate QoS-related predictions or network element models associated with the PE such that a comprehensive understanding of expected nominal QoS of various network elements (e.g., nodes 110 and WAPs 160, along with their respective PE interconnections) may be rapidly determined. Such QoS-related predictions or network element models may comprise expected over-utilization or under-utilization of one or more router interface queuing structures, expected outages at various system, channel, service, link or other portions of the network, as well as other expected conditions which may negatively impact QoS levels of services provided to customers via a specific node 100 or WAP 160.

In various embodiments, the QoS models may be used by network management entities such as associated with the EPC 120, the WC 150, the UE communications manager 105-CM and the like to determine appropriate UE connectivity using factors other than UE sensed signal strength and the like.

Various elements or portions thereof depicted in FIG. 1 and having functions described herein are implemented at least in part as computing devices having communications capabilities, including for example the UE 105, nodes 110, SAS 140, WC 150, QM 155, WAP 160 and various portions of the EPC 120. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various embodiments contemplate systems, methods, mechanisms and the like to reduce idle moments in UE converged network communications by dynamically migrating users between WiFi networks (e.g., 802.11xx) and mobile networks (e.g., 3G, 4G/LTE, 5G) by updating and maintaining UE information for each network (e.g., identification/attachment information), using congestion-indicative information to opportunistically identify UE handoff/migration opportunities, and rapidly executing handoff/migration of one or more UE using the updated/maintained UE information.

An indicator of WiFi network utilization level is a network allocation vector (NAV), which is used by UE such as mobile phones to signal to other UE an amount of time for the other UE to wait before accessing the same WiFi network channel; essentially a virtual count-down from some number that, when reaching zero, triggers access to the network. Thus, the NAV may be used as a virtual carrier sensing mechanism for UE accessing transmission channels in a WiFi network.

Figure 2:
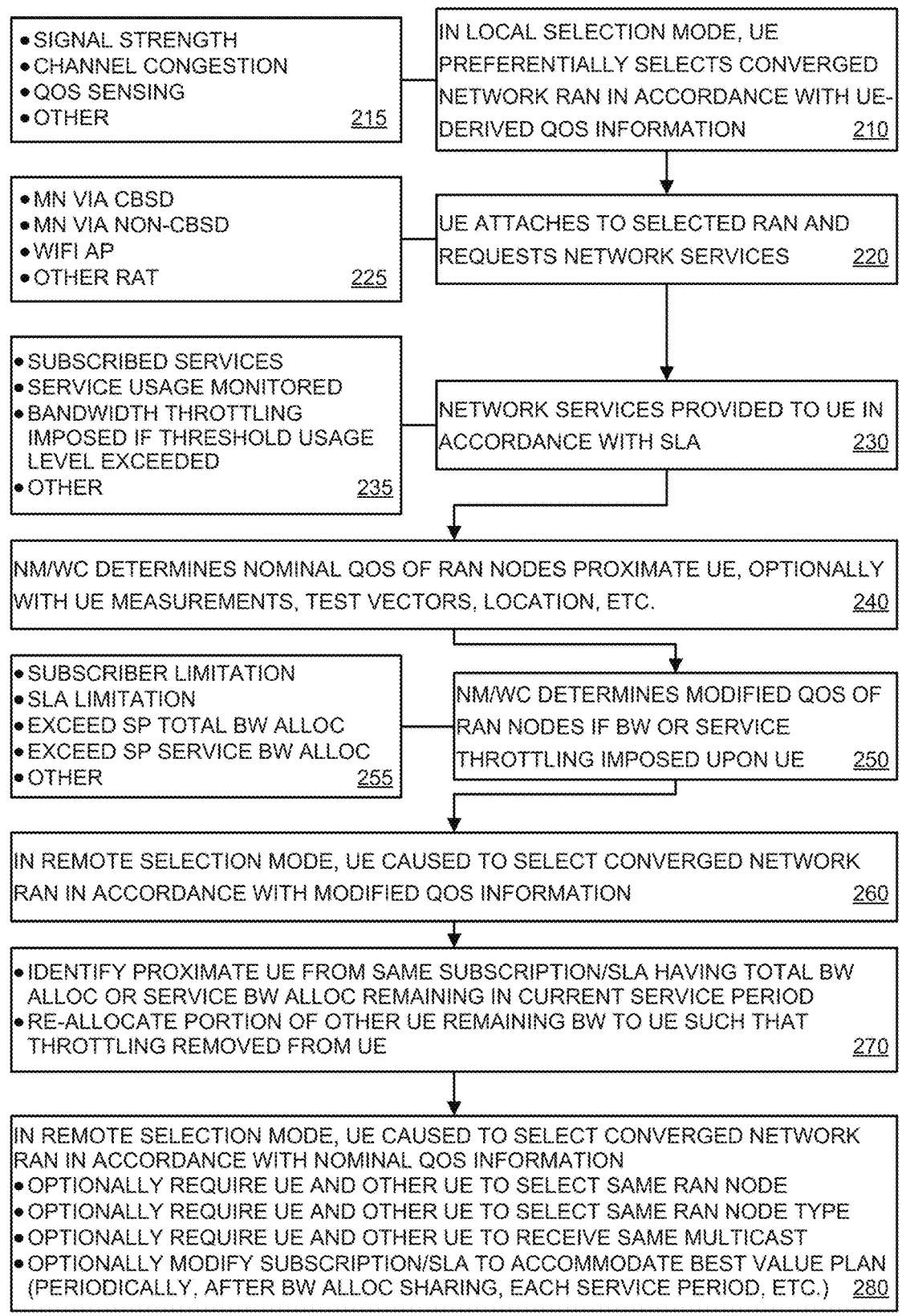
FIG. 2 depicts a flow diagram of a communications management method according to an embodiment.

FIG. 2 depicts a flow diagram of a RAN node/WAP selection method according to an embodiment. The method 200 of FIG. 2 contemplates various functions performed by UE 105, nodes 110, SAS 140, WC 150, WAP 160, and other functional entities as described herein with respect to the various embodiments.

Generally speaking, the method 200 of FIG. 2 is directed to managing UE 105 associated with a network services provider capable of providing network services via either of at least a mobile network (e.g., 3G/4G/LTE/5G network) and a WiFi network (e.g., 802.11xx network). The method 200 contemplates that UE 105 authenticated to the converged network via connection to RANs associated with the mobile network or WiFi network may be migrated between different RAN nodes/WAPs in accordance with UE and upstream QoS information, the imposition of data throttling and other QoS limitations on the UE, and the availability of other UE associated with the same subscriber, subscriber group, service level agreement (SLA) and the like. For example, UE associated with a common subscriber or SLA (e.g., several dual-RAT mobile devices associated with a family or business) where the UE is associated with respective fixed data limits or unlimited data limits that imposes data throttling after a bandwidth threshold is reached.

At step 210, the UE operating in a local selection mode preferentially selects a converged network RAN node/WAP in accordance with UE derived QoS information. Referring to box 215, the selection may be made in accordance with detected signal strength, channel congestion, QoS sensing and/or other measured or received information indicative of local RAN node/WAP QoS.

At step 220, the UE attaches/connects to the selected RAN node/WAP and requests network services. Referring to box 225, the UE may be attached to the mobile network via a CBSD node 110 or a non-CBSD node 110 (e.g., UE 105 attaches to a node 110 of a 3G, 4G/LTE, or 5G mobile network), to a WiFi AP 160, or to some other RAN node/WAP (not shown). Attachment comprises various known steps such as the UE being authenticated by the mobile network, and the UE being associated with a subscriber having a service level agreement (SLA) defining quality of service (QoS) and other metrics of network services to be provided to the subscriber. The international mobile subscriber identifier (IMSI) of the UE and other information may be provided to the MME, along with the current tracking area of the UE, which is periodically updated as the UE location moves between different nodes 110 or sectors thereof. Other functions are also contemplated during this attachment as is known. It is noted that the a CBSD node 110 is mobile network node that has previously been registered with the SAS 140, and which has been granted spectrum by the SAS 140 for use in communicating with UE 105 and for performing other functions as is known.

At step 230, the provider equipment begins providing the requested network services to the UE in accordance with the SLA associated with the UE. Referring to box 235, subscribed services are provided, service usage is monitored, bandwidth throttling is imposed if threshold usage levels are exceeded (e.g., either per-service bandwidth allocation or total bandwidth allocation), and other SLA-defined functions are performed.

At step 240, the wireless controller 150 (and/or other network management entity) determines a nominal QoS of each RAN node/WAP proximate the UE. In various embodiments, the nominal QoS level for each of the identified RAN nodes/WAPs (and/or channels supported thereon) may be determined using contemporaneously measured QoS-related parameters, such as from the UE (e.g., RAN node/WAP signal strength, channel congestion as indicated by channel specific signal strength and/or noise, etc.) and/or PE (e.g., channel or link-specific QoS indications such as provided by network monitoring systems, including measures of bit error rates, error correction rates, network congestion levels and so on as indicated via relevant routers, links, interfaces and the like within the network). In various embodiments, the nominal QoS level for each of the identified RAN nodes/WAPs (and/or channels supported thereon) may be determined using test vectors/results generated by transmitting data back and forth between the UE and a testing server, location information of the UE and so on.

In various embodiments, the nominal QoS level for each of the identified RAN nodes/WAPs (and/or channels supported thereon) may be determined using predictive information such as historic or characteristic QoS information. Such predictive information may comprise RAN node/WAP channel QoS predictive information generated via machine learning such as described in more detail below with respect to FIG. 3. That is, at step 240 the location of the UE is determined such as via mobile network tracking information and the like, the RAN nodes/WAPs such as nodes 110 and WAPs 160 proximate the UE are identified (i.e., RAN nodes/WAPs having a coverage area including the location of the UE), and a nominal QoS level for each of the identified RAN nodes/WAPs is determined.

At step 250, the wireless controller 150 (and/or other network management entity) determines a modified QoS of the various RAN nodes/WAPs by adapting the nominal QoS in view of service throttling and the like imposed upon the UE by the service provider. Referring to box 255, the nominal QoS of a RAN node/WAP may be modified due to subscriber limitation, service level agreement limitation, a total/usage bandwidth allocation in a service period being exceeded, a service-specific bandwidth allocation in a service period being exceeded, and/or some other subscription related modification imposed upon the otherwise available QoS of the RAN node/WAP. That is, at step 250 each RAN node/WAP having a coverage area including the location of the UE has determined for it a modified QoS level, wherein the respective nominal QoS level is modified in accordance with any active service provider bandwidth limitation imposed upon the UE. Determining whether or not an active service provider bandwidth limitation or throttling has been imposed upon the UE may be made performed by communicating with the various management functions associated with the EPC 120, such as the HSS 128, MME 124 and/or other management entities (not shown).

At step 260, the UE operating in a remote selection mode is caused to select the RAN node/WAP associated with the highest modified QoS level. In the case of UE not subjected to data throttling or other QoS reduction, the RAN node/WAP associated with the highest modified QoS level comprises the RAN node/WAP having the highest nominal QoS level. In the case of UE subjected to data throttling or other QoS reduction, it is noted that such data throttling/QoS reduction may be different depending upon the particular RAN node/WAP (e.g., MN node 110 vs WAP 160, CBSD MN node vs. non-CBSD MN, etc.), the particular service utilized by the UAE (e.g., Streaming video vs. voice), and/or other factors.

Generally speaking, step 240 contemplates various embodiments wherein a "nominal" QoS of a node or WAP associated with a RAN may be determined using measured PE information, measured PE and UE information, and/or predicted PE information and generally representing a QoS capability of each of the nodes or WAPs forming a RAN coverage area including the UE such that an automatic selection of a "best" node or WAP may be made.

Generally speaking, step 250 contemplates various embodiments wherein a "modified" QoS of a node or WAP associated with a RAN may be determined by modifying the respective nominal QoS in accordance with an imposed data throttling or other QoS reduction imposed by the network provider on the UE due to a subscriber or subscription related issue, such as excessive data consumption, low QoS plan limits, disfavored application usage and the like.

A model of the QoS of a node or WAP associated with a RAN may be generated by collecting relevant QoS data over time to provide historical QoS data which may be correlated and processed (by, for example, a machine learning module) to provide a reasonably accurate representation of the expected QoS of the node or WAP at the current moment in time.

The nominal/modified QoS of a node or WAP associated with a RAN, however determined, may by compared to a QoS required by UE applications and/or network services to determine if the nominal/modified QoS of a node or WAP associated with a RAN are adequate. That is, a per-application and/or per-service adequacy determination may be made with respect to QoS.

A model of application and/or service QoS requirements may be made by collecting relevant application and/or service data usage, error information, customer satisfaction information and the like over time to provide historical data which may be correlated and processed (by, for example, a machine learning module) to provide a reasonably accurate representation of the minimum QoS requirements of a satisfying user experience for an application and/or network service.

At step 270, the wireless controller 150 (and/or other network management entity) identifies other UE from the same subscription/SLA proximate the first UE (i.e., the UE described above with respect to steps 210-260) and determines whether such other UE have any remaining total bandwidth allocation or relevant service bandwidth allocation remaining in the current service period such that the other UE are not subject to bandwidth throttling or other QoS limitation. If the other UE has a remaining bandwidth allocation, then a portion of that remaining bandwidth allocation is reallocated to the first UE such that bandwidth throttling and/or QoS reduction is no longer imposed upon the first UE.

At step 280, the first UE operating in a remote selection mode is caused to select the RAN node/WAP associated with the highest nominal QoS level. Several operational constraints may optionally be imposed at step 280.

In some embodiments, the first UE and other UE are constrained to select and connect to the same RAN node/WAP or the same type of RAN node (e.g., both connected to a node 110 or both connected to a WAP 160), such as a home or office CBSD or non-CBSD MN node 110, or WiFi AP 160.

In some embodiments, the first UE and other UE are constrained to receive the same multicast stream (e.g., such as multiple family members viewing the same movie on different wireless devices at home where one of the wireless devices is otherwise in a throttled mode of operation).

In some embodiments, the subscription/SLA of the relevant subscriber is modified to accommodate a best value plan based upon current or recent/average usage. Such modification may be performed periodically, after a band with allocation sharing event, at the end of each service period or in accordance with some other schedule. Such embodiments provide a dynamic subscriber pricing plan in which bandwidth usage parameters and the like associated with an originally selected plan are automatically modified over time in response to actual usage of subscriber UE.

Figure 3:
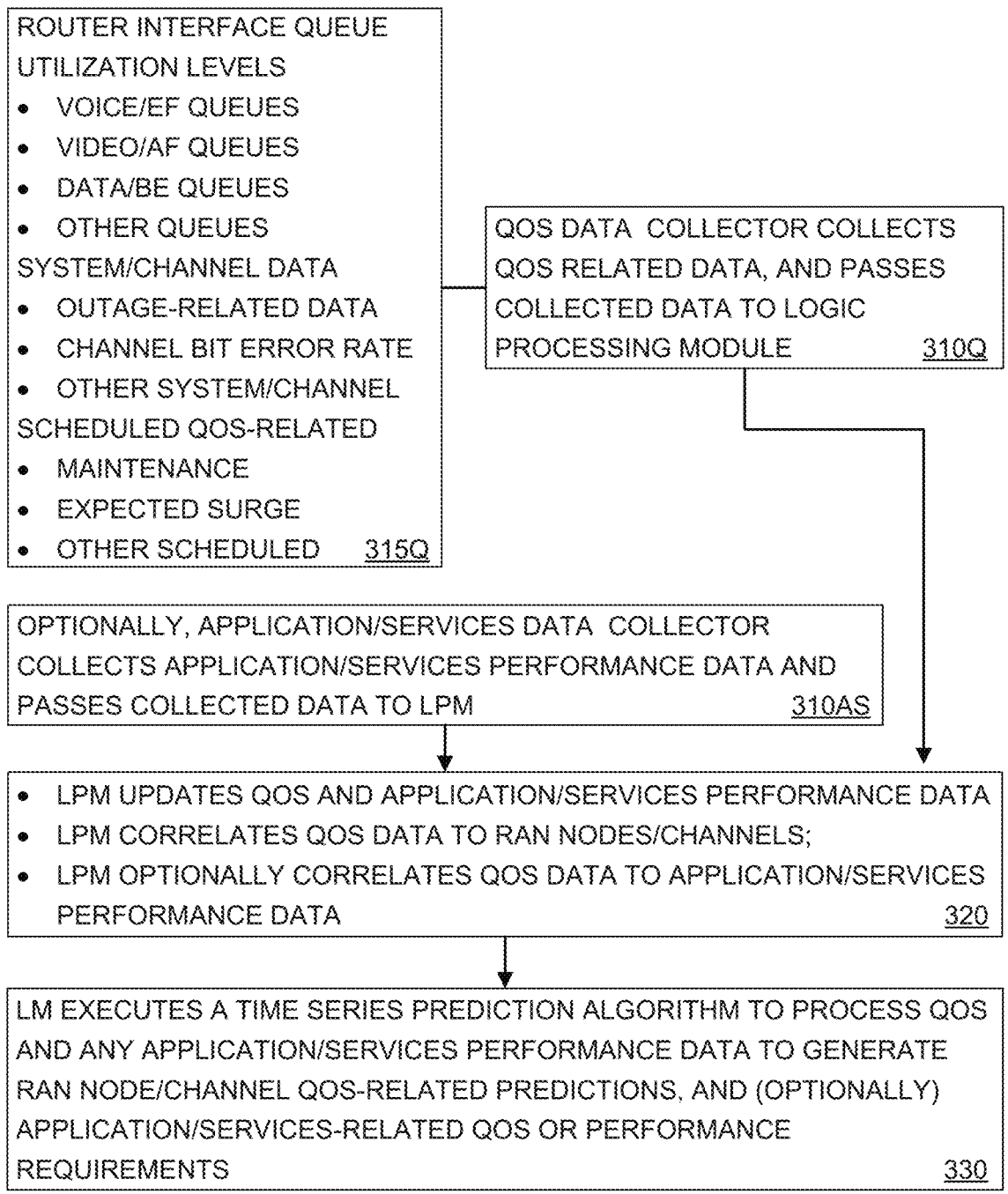
FIG. 3 depicts a flow diagram of a method for generating QoS predictive data according to an embodiment.

FIG. 3 depicts a flow diagram of a method for generating QoS predictive data according to an embodiment. In particular, FIG. 3 depicts a method 300 suitable for use by, illustratively, the QoS manager 155 described above with respect to FIG. 1 and various steps described above with respect to the method 200 of FIG. 2.

At step 310Q, the QoS data collector 155-QDC collect QoS-related data and passes the collected data to the logic processing module 155-LPM. The QoS-related data may be associated with PE (and/or portions thereof) used for delivering network services to UE 105, such as nodes 110, elements of the EPC 120, WAPs 160, elements of access networks 170, communication channels thereof, and or portions/subsystems thereof. Referring to box 315Q, QoS-related data may comprise router interface queue utilization levels, such as from expedite forwarding (EF) queues normally used for voice, assured forwarding (AF) queues normally used for video, best effort (PE) queues normally used for other data, and/or other queues, queuing structures or combinations thereof. QoS-related data may also comprise system/channel data associated with QoS, such as outage related data, channel bit error rate data and/or other system/channel performance data/metrics indicative of QoS. QoS-related data may also comprise data pertaining to scheduled maintenance, expected surges in traffic, expected surges in customer connections and/or other scheduled or predicted events that impact QoS. That is, at step 310Q, QoS data pertaining to PE supporting delivery of network services to UE via a node or WAP such as current utilization level data for each router interface queue supporting a client service is received from each of the plurality of routers and other PE within the service provider network.

At optional step 310AS, the application/network services data collector 155-ANSDC collects performance data associated with UE implemented applications, network services and the like, and passes the collected data to the logic processing module 155-LPM. The application data may include data indicative of historical QoS associated with minimum or sufficient application performance.

It is contemplated that steps 310Q and 310AS operate in a substantially contemporaneous manner to continually and independently collect and provide to the logic processing module 155-LPM respective QoS-related data and application/network services performance data.

At step 320, the logic processing module 155-LPM updates collected QoS data and any collected performance data, correlates collected QoS data with the RAN nodes, WAPs, channels, and/or other portions thereof, and (optionally) correlates the QoS data with the application and network services performance data. Other data grooming functions may also be performed.

At step 330, the learning machine 155-LM is executes a time series prediction algorithm to process the collected QoS data, management information such as network topology data, the optionally collected performance data and other data associated with the PE, UE, and/or use thereof to generate QoS-related predictions or network element models associated with the PE such that a comprehensive understanding of expected nominal QoS of various network elements (e.g., nodes 110 and WAPs 160, along with their respective PE interconnections) may be rapidly determined. Such QoS-related predictions or network element models may comprise expected over-utilization or under-utilization of one or more router interface queuing structures, expected outages at various system, channel, service, link or other portions of the network, as well as other expected conditions which may negatively impact QoS levels of services provided to customers via a specific node 100 or WAP 160.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method for managing network connectivity of dual radio access network (RAN) capable user equipment (UE) within a converged network comprising mobile network nodes and WiFi access points (WAPs), the method comprising:
   determining a location of subscriber UE;
   determining, for RAN nodes or WAPs supporting a coverage area including the location of the UE, respective nominal Quality of Service (QoS) levels;
   determining, for the RAN nodes or WAPs supporting the coverage area including the location of the UE, respective modified QoS levels in accordance with the respective nominal QoS levels and any active service provider bandwidth limitation imposed upon the UE;
   selecting, for use by the UE, a RAN node or WAP associated with a highest modified QoS level;
   wherein the UE comprises first UE of a plurality of UE associated with a common service period bandwidth limitation, the method further comprising:
   determining if the location of the first UE is proximate a location of other UE associated with the common service period bandwidth limitation; and
   in response to the service period bandwidth limitation of proximate other UE not being exceeded, allocating to the first UE at least a portion of a remaining service period bandwidth limitation of proximate other UE to thereby increase the service period bandwidth limitation of the first UE.

2. The method of claim 1, wherein the nominal QoS level of a node or WAP is determined using QoS information of respective provider equipment (PE) supporting network services provided by the node or WAP.

3. The method of claim 2, wherein the nominal QoS level of a node or WAP is determined using contemporaneously measured QoS indicators.

4. The method of claim 1, wherein the nominal QoS level of a node or WAP is determined using contemporaneously measured QoS indicators of each of a plurality of node or WAP channels.

5. The method of claim 1, wherein the nominal QoS level of a node or WAP is determined using a QoS model of the node or WAP.

6. The method of claim 5, wherein the QoS model of the node or WAP comprises a model generated by a machine learning module in response to historical QoS data.

7. The method of claim 5, wherein the QoS model of the node or WAP comprises a model generated by a machine learning module in response to historical QoS data, application data, and network services data.

8. The method of claim 7, wherein the machine learning module is configured to execute a time series prediction algorithm to provide thereby a continually updated QoS model of the node or WAP.

9. The method of claim 7, wherein the application data includes data indicative of sufficiency of QoS for application performance.

10. The method of claim 1, wherein the active service provider bandwidth limitation comprises a bandwidth throttling imposed upon the UE after the UE has exceeded a service period bandwidth limitation.

11. The method of claim 1, further comprising:
   in response to first UE data usage exceeding an increased service period bandwidth limitation such that an active service provider bandwidth limitation is imposed upon the first UE, selecting, for use by the first UE, a RAN proximate the first UE that is associated with the highest modified QoS level.

12. The method of claim 1, further comprising:
   in response to other UE data usage exceeding a decreased service period bandwidth limitation such that an active service provider bandwidth limitation is imposed upon the other UE:
      determining, for each RAN having a coverage area including the location of the other UE, a nominal QoS level of network services delivered to the other UE via the RAN;
      determining, for each RAN having the coverage area including the location of the other UE, a modified QoS level in accordance with the respective nominal QoS level and any active service provider bandwidth limitation imposed upon the other UE; and
      selecting, for use by the other UE, a RAN associated with the highest modified QoS level.

13. The method of claim 1, further comprising selecting, for use by the first UE, a RAN associated with the highest nominal QoS level.

14. The method of claim 1, further comprising selecting, for use by the first UE and the proximate other UE, a RAN associated with the highest nominal QoS level.

15. The method of claim 1, further comprising selecting, for use by the first UE and the proximate other UE, a predefined RAN associated with a subscriber location.

16. The method of claim 15, wherein the predefined RAN associated with the subscriber location comprises a home WiFi access point.

17. A system for managing network connectivity of dual radio access network (RAN) capable user equipment (UE) within a converged network comprising mobile network nodes and WiFi access points (WAPs), the system comprising:
   a controller configured for determining a location of subscriber UE, for determining a nominal Quality of Service (QoS) level for RAN nodes or WAPs supporting a coverage area including the location of the UE, and for determining a modified QoS level in accordance with each determined nominal QoS level and any active service provider bandwidth limitation imposed upon the UE;
   the controller further configured for selecting, for use by the UE, a RAN node or WAP associated with a highest modified QoS level;
   wherein the UE comprises first UE of a plurality of UE associated with a common service period bandwidth limitation;
   the controller further configured for:
   determining if the location of the first UE is proximate a location of other UE associated with the common service period bandwidth limitation; and
   in response to the service period bandwidth limitation of proximate other UE not being exceeded, allocating to the first UE at least a portion of a remaining service period bandwidth limitation of proximate other UE to thereby increase the service period bandwidth limitation of the first UE.

18. The system of claim 17, wherein the nominal QoS level of a node or WAP is determined using QoS information of respective provider equipment (PE) supporting network services provided by the node or WAP.

19. The system of claim 17, wherein the nominal QoS level of a node or WAP is determined using at least one of contemporaneously measured QoS indicators of each of a plurality of node or WAP channels, and a QoS model of the node or WAP.

20. A tangible and non-transient computer readable storage medium storing instructions which, when executed by a computer, adapt operation of the computer to provide a method for managing network connectivity of dual radio access network (RAN) capable user equipment (UE) within a converged network comprising mobile network nodes and WiFi access points (WAPs), the method comprising:
   determining a location of subscriber UE;
   determining, for RAN nodes or WAPs supporting a coverage area including the location of the UE, respective nominal Quality of Service (QoS) levels;
   determining, for the RAN nodes or WAPs supporting the coverage area including the location of the UE, respective modified QoS levels in accordance with the respective nominal QoS levels and any active service provider bandwidth limitation imposed upon the UE; and
   selecting, for use by the UE, a RAN node or WAP associated with a highest modified QoS level;
   wherein the UE comprises first UE of a plurality of UE associated with a common service period bandwidth limitation, the method further comprising:
   determining if the location of the first UE is proximate a location of other UE associated with the common service period bandwidth limitation; and
   in response to the service period bandwidth limitation of proximate other UE not being exceeded, allocating to the first UE at least a portion of a remaining service period bandwidth limitation of proximate other UE to thereby increase the service period bandwidth limitation of the first UE.

* * * * *